United States Patent
VerWeyst et al.

(10) Patent No.: US 9,998,472 B2
(45) Date of Patent: Jun. 12, 2018

(54) SEARCH PERSONALIZATION AND AN ENTERPRISE KNOWLEDGE GRAPH

(71) Applicant: Google LLC, Mountain View, CA (US)

(72) Inventors: Brent VerWeyst, San Francisco, CA (US); Martin James Cochran, San Francisco, CA (US); Jimin Li, Los Altos, CA (US); Albert Orriols Puig, Santa Clara, CA (US); John Xiao, Cupertino, CA (US)

(73) Assignee: Google LLC, Mountain View, CA (US)

( * ) Notice: Subject to any disclaimer, the term of this patent is extended or adjusted under 35 U.S.C. 154(b) by 285 days.

(21) Appl. No.: 14/723,827

(22) Filed: May 28, 2015

(65) Prior Publication Data

US 2016/0350307 A1 Dec. 1, 2016

(51) Int. Cl.
*H04L 29/06* (2006.01)
*G06F 21/62* (2013.01)

(52) U.S. Cl.
CPC ........ *H04L 63/101* (2013.01); *G06F 21/6227* (2013.01)

(58) Field of Classification Search
CPC ... H04L 63/101; H04L 51/22; G06F 21/6227; G06F 17/277; G06F 17/3053; G06F 17/30554; G06F 17/3064; G06F 17/30675; G06F 17/30867; G06Q 10/107
See application file for complete search history.

(56) References Cited

U.S. PATENT DOCUMENTS

| 8,725,770 | B2 | 5/2014 | Koide et al. |
| 8,751,505 | B2 | 6/2014 | Carmel et al. |
| 8,880,466 | B2 | 11/2014 | Prahlad et al. |
| 2004/0128616 | A1* | 7/2004 | Kraft ................ G06F 17/30011 715/239 |

(Continued)

FOREIGN PATENT DOCUMENTS

WO 2014/139057 9/2014

OTHER PUBLICATIONS

International Search Report and Written Opinion in International Application No. PCT/US2016/031187, dated Jul. 7, 2016, 15 pages.

(Continued)

*Primary Examiner* — Jorge A Casanova
(74) *Attorney, Agent, or Firm* — Fish & Richardson P.C.

(57) ABSTRACT

Methods, systems, and apparatus, including computer programs encoded on a computer storage medium for searches associated with the enterprise information. In one aspect, a method includes receiving a query from a member of an enterprise; searching an index that includes member information and resources: the resources include entities and entity facts related to the enterprise; the entity facts are identified from the entities; the index includes data defining access privileges to the entities and the entity facts according entity fact access control lists; determining the entity facts that are accessible to the member according to the entity fact access control lists; determining, based on member information and entity facts, search result data including data describing entities and entity facts relevant to the query; and (Continued)

providing search results to the member of the enterprise, the search results including the entities and entity facts determined to be relevant to the query.

20 Claims, 8 Drawing Sheets

(56) References Cited

U.S. PATENT DOCUMENTS

| | | | |
|---|---|---|---|
| 2006/0059144 A1* | 3/2006 | Canright | G06F 17/30011 |
| 2006/0129538 A1 | 6/2006 | Baader et al. | |
| 2007/0027866 A1* | 2/2007 | Schmidt-Karaca | G06F 17/301 |
| 2008/0140679 A1 | 6/2008 | Deyo et al. | |
| 2008/0168048 A1* | 7/2008 | Bell | G06F 17/30864 |
| 2009/0327271 A1 | 12/2009 | Amitay et al. | |
| 2011/0087661 A1* | 4/2011 | Quick | G06F 17/30554 707/732 |
| 2011/0173679 A1 | 7/2011 | Perumal et al. | |
| 2011/0282652 A1* | 11/2011 | Fokoue-Nkoutche | G06F 17/30734 704/9 |
| 2012/0158633 A1 | 6/2012 | Eder | |
| 2013/0238631 A1* | 9/2013 | Carmel | G06F 17/30604 707/742 |
| 2013/0238659 A1 | 9/2013 | Roitman et al. | |
| 2014/0046934 A1 | 2/2014 | Zhou et al. | |
| 2014/0157370 A1* | 6/2014 | Plattner | G06F 21/6245 726/4 |
| 2014/0282219 A1 | 9/2014 | Haddock | |
| 2014/0298481 A1* | 10/2014 | Gilroy | G06F 21/604 726/27 |
| 2015/0006581 A1* | 1/2015 | Luo | G06F 21/6218 707/783 |
| 2015/0026260 A1 | 1/2015 | Worthley | |
| 2015/0074819 A1* | 3/2015 | Borenstein | G06F 21/6218 726/27 |
| 2015/0294007 A1* | 10/2015 | Chen | G06F 17/3043 707/749 |

OTHER PUBLICATIONS

Kirrane, "DC Proposal: Knowledge Based Access Control Policy Specification and Enforcement," Jan. 1, 2011, The Semantic Web—ISWC 2011, Springer Berlin Heidelberg, Berlin, Heidelberg, pp. 293-300, XP019168O88.

Kirrane, "Linked data with access control," Dissertation submitted in pursuance of the degree of Doctor of Philosophy, Jan. 29, 2015, 189 pages, XP055282365.

Qin et al., "Concept-Level Access Control for the Semantic Web," Proceedings of the ACM Workshop on XML Security 2003, ACM, Oct. 31, 2003, pp. 94-103, XP001198174.

Roitman et al., "An authorization model for entity search," Proceedings of the 1st International Workshop on Search and Mining Entity-Relationship Data, SMER '11, Jan. 1, 2011, pp. 25-26, XP055281943.

Ryutov et al, "Access Control Policies for Semantic Networks," Policies for Distributed Systems and Networks, 2009. Policy 2009. IEEE International Symposium on, IEEE, Jul. 20, 2009, pp. 150-157, XP031505478.

International Preliminary Report on Patentability issued in International Application No. PCT/US2016/031457, dated Dec. 7, 2017, 9 pages.

International Preliminary Report on Patentability issued in International Application No. PCT/US2016/031187, dated Dec. 7, 2017, 9 pages.

International Search Report and Written Opinion in International Application No. PCT/US2016/031457, dated Jul. 7, 2016, 15 pages.

* cited by examiner

SEARCH PERSONALIZATION AND AN ENTERPRISE KNOWLEDGE GRAPH

BACKGROUND

This specification relates to access control for enterprise information, personal assistance based on enterprise information and personal information, and searches associated with the enterprise information.

Enterprises can have access to a large number and wide variety of resources (e.g., documents). Each of the resources may have access control lists that are associated with the resource to dictate who can view and/or alter the resource. Members of an enterprise may have difficulty in finding and searching for necessary information because the resources are not connected or associated with one another in any meaningful way. Furthermore, and for similar reasons, electronic personal assistants typically cannot leverage enterprise information in meaningful ways to satisfy users' informational needs.

SUMMARY

This specification describes technologies relating to access control for enterprise information, personal assistance based on enterprise information and personal information, and searches associated with the enterprise information.

In general, one innovative aspect of the subject matter described in this specification can be embodied in a method that includes receiving a query from a member of an enterprise, and searching an index that includes member information of members of the enterprise and resources of the enterprise. The searching an index may include the resources include data describing entities and entity facts related to the enterprise and relationships among the entities, the entity facts being identified from the entities of the resources of the enterprise, each entity fact describing at least one feature of the entity that identifies corresponding relationships between the entities and members of the enterprise, and the index including data defining access privileges to the data describing the entities and the entity facts according to respective entity fact access control lists. The method may also include determining the entity facts that are accessible to the member according to the entity fact access control lists, and determining, based on member information of the member and entity facts that are accessible to the member, search result data including data describing entities and entity facts relevant to the query. Further, the method may include providing search results, based on the search result data, to the member of the enterprise, the search results including data describing the entities and entity facts determined to be relevant to the query.

Particular implementations of the subject matter described in this specification can be implemented so as to realize one or more of the following advantages. In some enterprise structures, it can be beneficial to extract information from the resources and compile that information while still respecting the access control list of the resource with the extracted information, as this will cause the extracted information to be easier to obtain by members of the enterprise while also protecting the access control lists associated with the resources. Also, it may be beneficial to have a computer-implemented person assistant to perform actions, where the computer-implemented personal assistant uses information from each member and extracted information from the resources while respecting the access control lists of the resources.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

Figure 1:
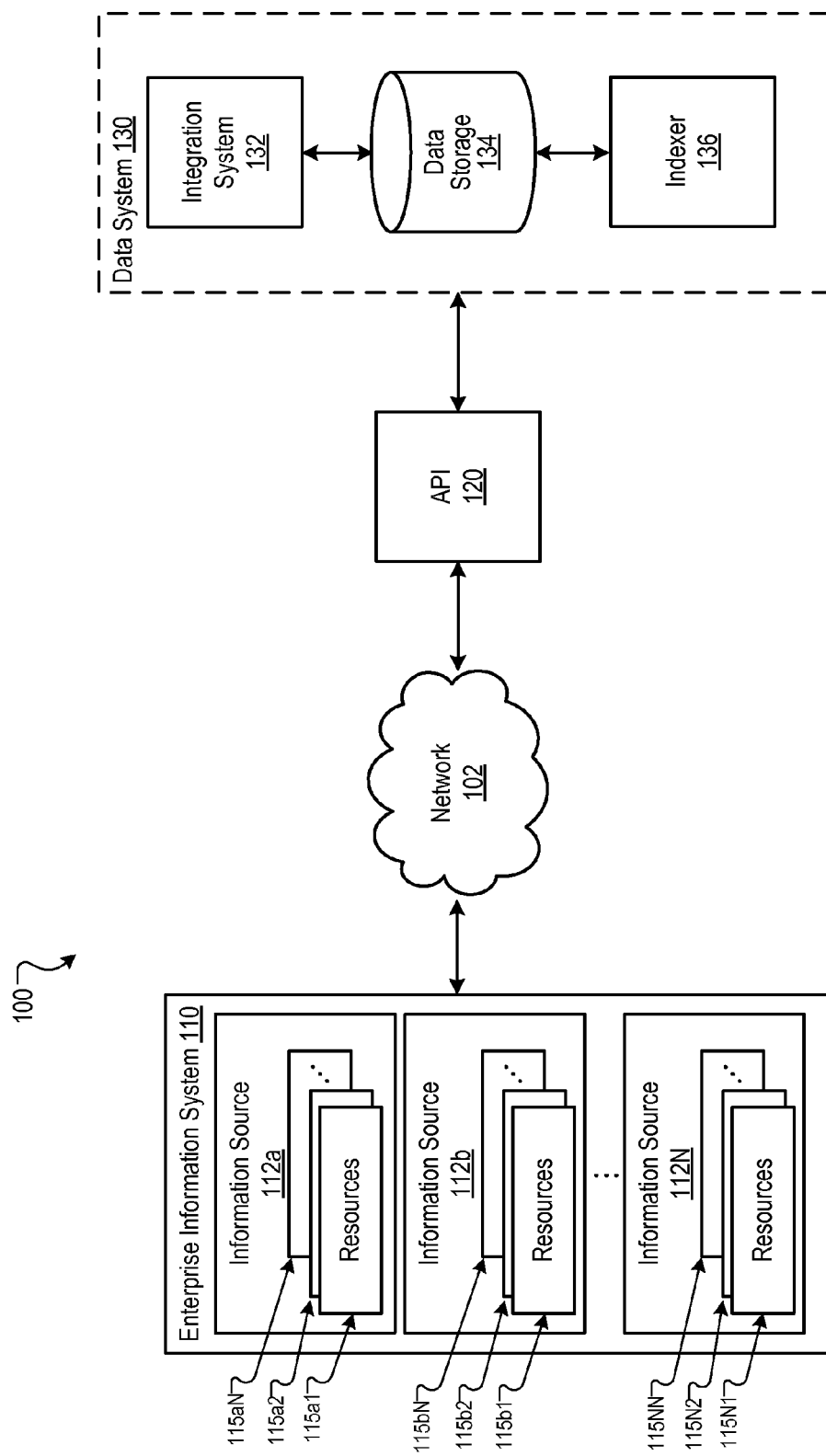
FIG. 1 is a block diagram of an example environment in which enterprise data is integrated.

FIG. 1 is a block diagram of an example environment 100 in which enterprise data is integrated. The example environment 100 includes a network 102, e.g., a local area network (LAN), wide area network (WAN), the Internet, or a combination of them, connects enterprise information system 110, application programming interface 120, and data system 130. The network 102 can be accessed over a wired and/or a wireless communications link. For example, mobile computing devices, such as smartphones can utilize a cellular network to access the network.

Enterprise information system 110 may include one or more information sources 112. As seen in FIG. 1, information sources 112 are identified as 112a, 112b, . . . , 112N, which include one or more sub-system, application, program, or database, among others. For example, information sources 112 may be an internal document database for an enterprise, an enterprise intranet, an enterprise email application, or any third party information source that the enterprise information system 110 is connected to (e.g., internet, software application). Each of the information sources 112 include resources 115, which in FIG. 1, may be identified as 115a1, 115a2 . . . 115an . . . 115n1 . . . 115NN. Resources 115 may be different for each information source 112. For example, resources 115 may be a document stored within the enterprise information system 110, intranet URL, email message, internet URL, or any similar type of informational content (e.g., information stored on third party application that the enterprise information system 110 has access to).

As used in this document, an "enterprise" is public or private legal entity to which members belong and for which the members undertake projects, tasks, and other actions on behalf of the enterprise. An example enterprise may be a privately held company, a publically traded company, and the like. "Enterprise information" is at least information that is authored, owned, curated or otherwise controlled, either partially or exclusively, by the enterprise.

Each resource 115 has an associated access control list (ACL) that indicates which members of the enterprise are allowed to access and/or modify that particular resource. The access control list for each resource may indicate access privileges, such as an owner (or creator) of the resource, read access, write access, and delete access, among others. The access control list for each resource may define access and/or modification privileges to individual members and/or one or more groups of members (e.g., sales department of an enterprise). Each resource 115 may also allow for versioning of the particular resource (e.g., version 1 of resource 115a1 and version 2 of resource 115a1), and the access control list for each version of the particular resource may be different from one another. Also, a particular resource may be created or defined as a "parent" or "child" of another resource. The access control list for any child resource will inherit the access control list for its defined parent resource; however, in some implementations, this is only a default access control list and the access control list for the child resource and/or parent resource may be modified without affecting the other. In variations of this implementation, a child resource may have additional access control list requirements beyond those inherited from the parent resource.

Resources 115 may be provided over network 102 to a data system 130 via an application programming interface (API) 120. API 120 may be designed by the enterprise, the operator of data system 130, or a third party (e.g., developed by a third party for a specific application or a more generally applicable API). API 120 may accept different access control list types that are used or presented in information sources 112 that include more or fewer different definitions or fields (e.g., owner, read or write access, parent, child, versions, etc.). Additionally, API 120 allows for multiple identifications for each member of the enterprise. For example, if a member has an identification of "Jane Doe" for information source 112a and has identification "JaneDoe@enterprise.com" for information source 112b, and the enterprise information system 110 has provided a description that both of these identifications relate to the same member, the API 120 can link both of these identifications with that particular member. Additionally, API 120 enables members to be classified in one or more group, and if the group is updated, added, or removed on at the enterprise information system 110, then the API 120 may sync with the enterprise information system 110 to reflect the changes at the API 120.

The resources 115 are received through the API 120 by the data system 130. A database schema implemented by data system 130 provides for the data system 130 to understand the information provided by enterprise information system 110 via the API 120 in order to integrate and structure the information. Further, the API 120 may tag the information associated with resources 115 according to the predefined schema in order for the data system 130 to integrate the information. In the current implementation, data system 130 includes an integration system 132, a data storage 134, and an indexer 136. Integration system 132 may be a database, server, module, application, or combination thereof, among others. Information from the integration system 132 is stored in data storage 134, and indexer 136 indexes the information stored in data storage 134 for the information to be searched by the members of the enterprise, which will be described below.

Entity Fact Access Control

Figure 2:
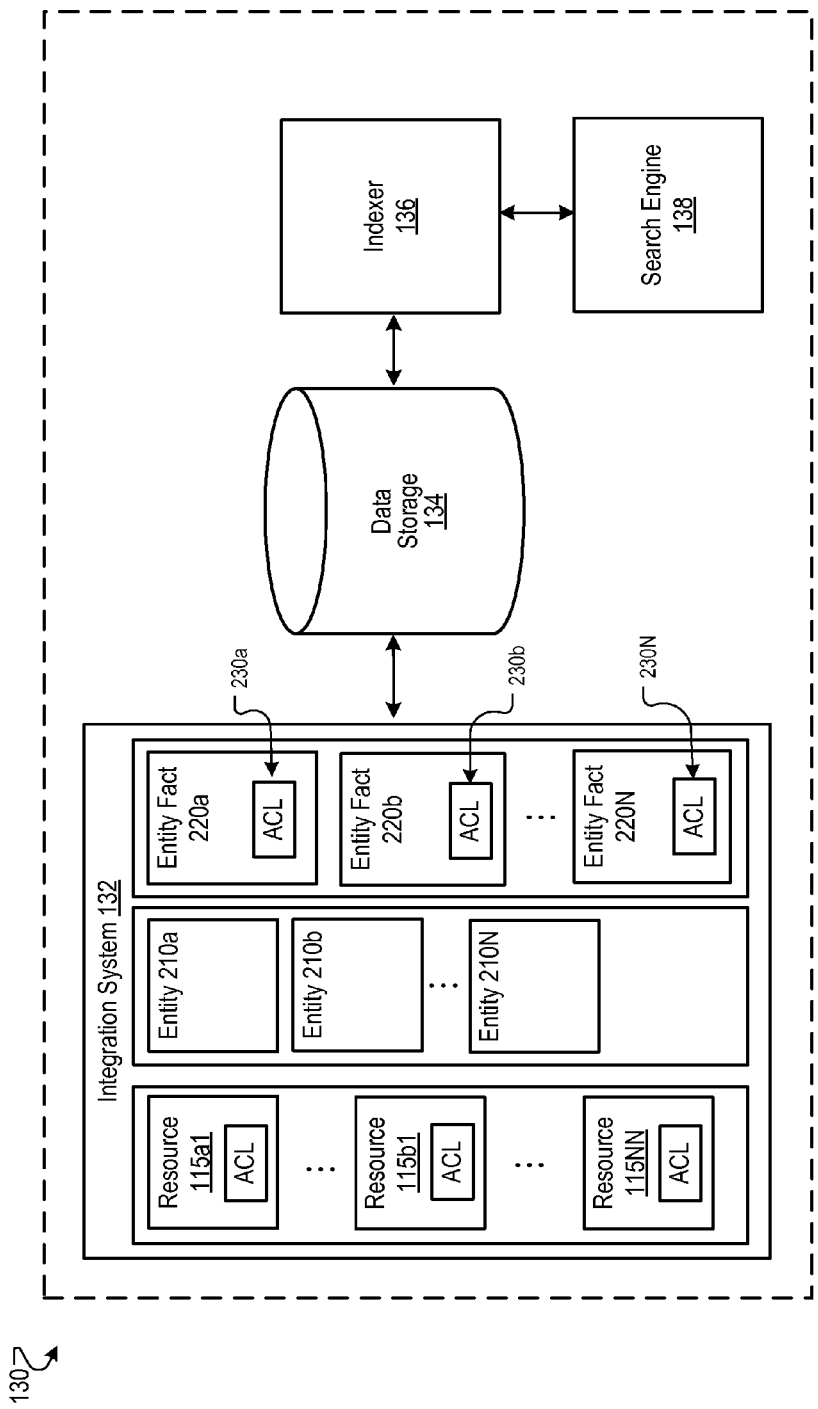
FIG. 2 is a block diagram of a data system.

FIG. 2 is a block diagram of data system 130. In some implementations, integration system 132 receives a plurality of resources 115 that each have an access control list specifying access privileges to the resource 115 for one or more members of the enterprise. Each resource includes data and/or information describing entities 210, which may be identified as entities 210a, 210b . . . 210N in FIG. 2. The entities 210 are related to the enterprise and relationships between the entities. Entities 210 of the enterprise may be, for example, people (or members), positions, projects, departments, sales information, performance evaluations, or any other information that is in the resources 115 of the enterprise. More generally, in some implementations, entities are topics of discourse, concepts or things that each have a distinct and independent existence and that can be referred to by a text fragment, e.g., a term or phrase, and are distinguishable from one another, e.g., based on context. An entity may thus be a physical or conceptual realization having a factual definition and attributes.

Additionally, integration system 132 derives entity facts 220, which may be identified as entity facts 220a, 220b, . . . 220N in FIG. 2 from the entities 210 of the resources 115. Each entity fact 220 describes at least one feature of an entity 210, where the features describe corresponding relationships between the entities 210. For example, a resource 115 (e.g., a document) of the enterprise may identify the names and positions of those in management of the enterprise where "Jane Doe" may be in management of the enterprise in the position of "Vice-President of Sales." In the current example, "Jane Doe" and "Vice-President of Sales" are entities, and an entity fact 220 may be defined in the integration system 132 that creates a relationship between the entities, where the entity relation may be expressed as a factual relation "Jane Doe"—"Vice-President of Sales." A variety of techniques may be used to identify entity facts. These include linguistic parsers that can be issued to determine, e.g., nouns and related attributes; database parsers that can be used to determine keyed relations between date fields; and so on.

Further, integration system 132 determines an entity fact access control list 230, which may be identified as 230a, 230b, . . . 230N in FIG. 2. An entity fact access control list 230 is determined for each entity fact 220, which is determined from the access control list of each resource 115. In some implementations, the access control list of a resource is inherited by each entity fact derived from the resource. For example, resource 115a1 may be a document with salary information of the members of the enterprise. Resource 115a1 may include "Jane Doe" as entity 210a and "$50,000" as entity 210b in a separate column (indicating Jane Doe's salary). As salary information is personal and sensitive information, the access control list for resource 115a1 may only include the Director of Human Resources, for example, "Mary." Resource 115b1 may be an intranet page that breaks down the salary amount of members by percentages, and may include "Jane Doe" as entity 211a and "Top 5%" as entity 211b (indicating Jane Doe's income percentage). The access control list for this information may provide access to all members of the enterprise (or a larger group of the members than resource 115a1). Entity facts may then be identified, and in the present example, may be "Jane Doe" and "$50,000" salary as entity fact 220a, and "Jane Doe" and "Top 5%" as entity fact 220b, which are derived from entities 210a, 210b, 211a, and 211b of resources 115a1 and 115b1.

Entity fact access control lists 230 may then be determined based on the resource from which the respective entity fact was derived. For example, entity fact access control list 230*a* for entity fact 220*a* will only include Mary because resource 115*a*1, from which entity fact 220*a* was derived, included Mary in the access control list. Entity fact access control list 230*b* for entity fact 220*b* will include all members of the enterprise because resource 115*b*1 included all members of the enterprise in the access control list. Based on the current example, Mary would have access to entity fact 220*a* and entity fact 220*b* because she is included in the access control list for both resource 115*a*1 and 115*b*1; however, other members, for example, "Alvin," a sales representative, would not have access to 220*a* because he is not part of the access control list for the underlying resource 115*a*1, but he would have access to entity fact 220*b* because he has access privileges to resource 115*b*1 based on the access control list associated with the document from which the fact 220*b* was derived.

The information sent to and obtained by the integration system 132 is stored in data storage 134. Data storage 134 stores, for example, data describing the entities 210, entity facts 220 and the respective entity fact access control lists 230, where each entity fact 220 is associated with its corresponding entity fact access control list 230. Indexer 136 then indexes the information in data storage 134. The members of the enterprise may then use a search engine 138 to, for example, search data storage 134 to access entity facts 220 of the resources 115 of the enterprise. Each member of the enterprise is provided access privileges to the data describing the entities 210 and the entity facts 220 according to the respective entity fact access control list 230.

Any appropriate search process can be used to realize the search engine 138. The search engine 138 can use, for example, one or more of an information retrieval (IR) score algorithm, an authority score algorithm, or a combination of relevance and authority algorithms.

Figure 3:
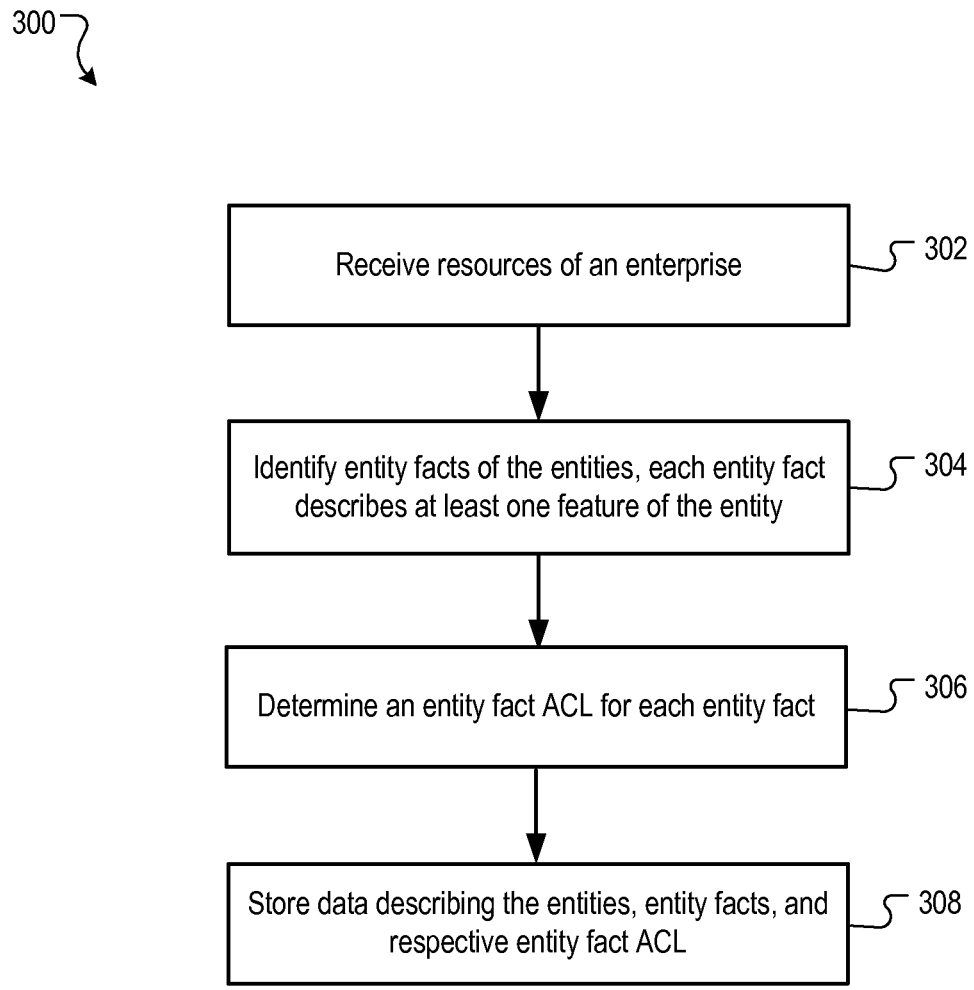
FIG. 3 is a flow diagram of an example process for providing access privileges to entity facts.

FIG. 3 is a flow chart of an example process 300 for providing access privileges to entity facts 220 based on respective entity fact access control lists 230 obtained from underlying resources 115 of the enterprise. The process 300 can, for example, be implemented by the data system 130. In some implementations, the operations of the example process 300 can be implemented as instructions stored on a non-transitory computer readable medium, where the instructions cause a data processing apparatus to perform operations of the example process 300.

Resources 115 of an enterprise, each resource having a respective access control list specifying access privileges to the resource for one or more members of the enterprise, and the resources including data describing entities 210 related to the enterprise and relationships among the entities 210 are received (302). Each information source 112 of the enterprise information system 110 includes resources 115, and the resources 115 may be provided over network 102 to a data system 130 via the API 120. Each resource 115 includes an access control list that indicates which members of the enterprise are allowed to access and/or modify that particular resource, and the access control list information for each resource 115 is received along with each respective resource. Each resource 115 includes entities 210 that are information related to the enterprise. For example, a resource 115*a*1 of the enterprise that identifies the names and positions of those in management of the enterprise where "Jane Doe" may be in management of the enterprise in the position of "Vice-President of Sales," may include "Jane Doe" as entity 210*a* and "Vice-President of Sales" as entity 210*b*.

Entity facts 220 of the entities 210 from the resources 115 of the enterprise are identified where each entity fact 220 describes at least one feature of the entity 210, and the features include corresponding relationships between the entities 210 (304). For example, from the example above, an entity fact 220 may be a relationship between "Jane Doe" and "Vice-President of Sales," where the entity fact 220 is "Jane Doe" is the "Vice-President of Sales." As such, a feature of "Jane Doe" is "Vice-President of Sales," and a feature of "Vice-President of Sales" is "Jane Doe."

For each entity fact 220, an entity fact access control list 230 is determined from the access control list of the resource from which the entities 210 of the entity fact 220 were derived (306). In the current implementation, the access control list of resource 115*a*1, which included entities 210*a* and 210*b*, will be used as the entity fact access control list 230 of entity fact 220. For example, if the access control list for resource 115*a*1 is the "Sales Department," then the members of the enterprise that are included in the "Sales Department" group, as defined at the enterprise information system 110, will have access privileges to the entity fact 220 of "Jane Doe" is the "Vice-President of Sales."

Data describing the entities 210, entity facts 220, and the respective entity fact access control lists 230 are stored in data storage 134 (308). Indexer 136 then indexes the information in data storage 134. The members of the enterprise may then use indexer 136 to, for example, search data storage 134 to access entity facts 220 of the resources 115 of the enterprise.

Each member of the enterprise is provided access privileges to the data describing the entities 210 and the entity facts 220 according to the respective entity fact access control list 230 in an indexer 136. For example, in the example above, if "Alvin" were a member of the "Sales Department," then Alvin would have access privileges to the entity fact 220 of "Jane Doe" is the "Vice-President of Sales" because Alvin is included in the entity fact access control list 230.

Members of the enterprise can query the search engine 138 for information and/or one or more resources 115. A query provided by a member of the enterprise will search indexer 136 for data, including resources 115, entities 210, and entity facts 220 that are stored in data storage 134, which may be relevant to the member's query. The entity fact access control lists 230, in some implementations, are applied to the query provided by the member, and the member may only receive information, including resources 115, entities 210, and entity facts 220, that the member has access privileges to according the access control lists associated with the information. Additionally, in some implementations, member information may also be provided from the enterprise information system 110 to the data system 130. Member information may include, for example, the role or position of one or more of the members in the enterprise, an organizational structure of the enterprise, the contacts of one or more members in the enterprise (e.g., email or telephone), the member's relationship with the provided query, as described below.

Information may be determined to be relevant to the member's query based on how relevant a resource, entity, and/or entity fact is determined to be to a member's query. Additional analysis and criteria may be applied to the member's query to determine what is to be provided in response to the member's query. For example, the member's title, position, or group within the enterprise can factor into what is relevant to the member as well as the content, including the source information 112 and resources 115, the member interacts with and uses. Additionally, activities of the member and the time and date the query was provided can factor into the relevancy. For example, interests related to the query member and information in the query member's email and calendar resources can factor into the relevancy. The search engine 138 may determine and analyze the relevancy to a member's query by the use of a knowledge graph; however, other methods of determining relevancy and relationships between resources 115, entities 210, and entity facts 220 may be used.

In the process of determining that an entity 210 or entity fact 220 is relevant to the query provided by a member, the search engine 138 also determines the query member's relationship with one or more entity 210 and entity fact 220. In some implementations, the search engine 138 may first determine whether the provided query corresponds to, or otherwise is determined to be relevant to, at least one of an entity 210 and entity fact 220. The search engine 138 then forms a relation between the provided query and the entities 210 and entity facts 220 determined to be relevant to the provided query. The search engine 138 may also determine the query member's relationship with the entities 210 and entity facts 220 determined to be relevant to the provided query.

Figure 4:
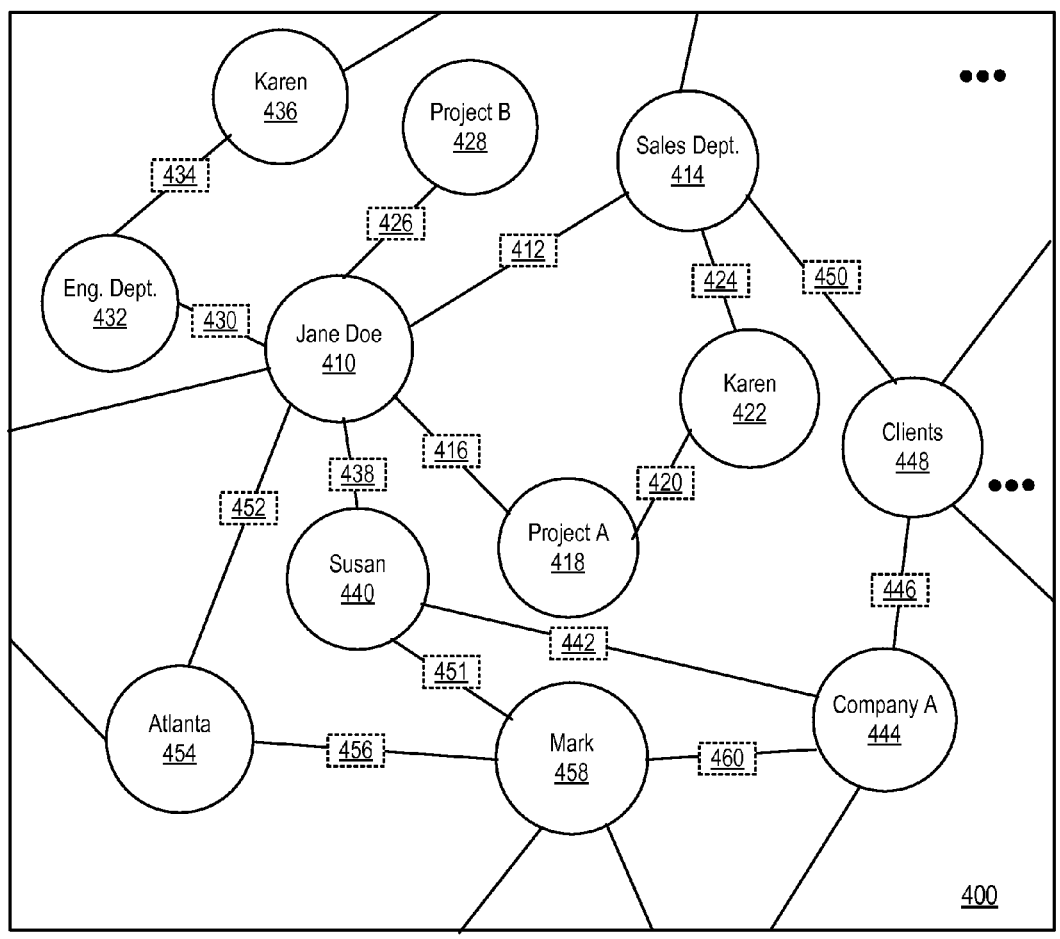
FIG. 4 is a block diagram of a portion of an example enterprise knowledge graph.

FIG. 4 is a block diagram of a portion of an example enterprise knowledge graph representation 400 of enterprise relationship information derived by the integration system 132. The knowledge graph has nodes and edges. Each node in the knowledge graph represents resources 115 and entities 210, and pairs of nodes in the knowledge graph are connected by one or more edges. Each edge representing a relationship dimension that defines an entity fact 220 between two resources 115, two entities 210, or one of each of a resource 115 and an entity 210 represented by the pair of nodes, or several edges represent a series of relationships that connect two nodes by one or more intermediate nodes. As previously stated, the information to form an entity fact 220 between entities 210 is determined from the content provided in resources 115. As shown in FIG. 4, the edges are unidirectional, but in other variations the edges may be bidirectional.

For example, the enterprise knowledge graph 400 includes nodes 410 and 414 that are connected by edge 412. In the present example, node 410, a member of the enterprise, "Jane Doe," is defined to be connected, by edge 412, with node 414, "Sales Department." Additionally, node 410 is determined to be connected, by edge 416, with node 418, "Project A." Node 422, "Karen," another "Sales Department" employee, as shown by the edge 424 between node 422 and node 414, is also connected by edge 420 to node 418. In the present example, node 410 is indirectly connected to node 422 via two separate relationships (node 414 and node 418). Node 410 is also connected to another project, "Project B," at node 428 by edge 426, and node 410 is connected to "Engineering Department," at node 432, by edge 430. For example, "Jane Doe," at node 410, may have corresponded with the "Engineering Department" in the past to determine if a project was feasible or to check on the status of an event or project. As such, an information source 112 (e.g., enterprise email) would include a resource 115 (e.g., email message) that would include the entities of "Jane Doe" and "Engineering Department," where an entity fact 220 could describe a relationship between the entities. Further, another enterprise member, "Karen," who works in the Engineering Department, at node 436 is connected to node 432 by edge 434.

Based on the exemplary enterprise knowledge graph 400, if enterprise member "Jane Doe," the entity at node 410, were to provide a search query "Karen," the Data System 130 would analyze the enterprise knowledge graph 400 to determine what is relevant to the query. For example, based on the connection between "Jane Doe" at node 410 and "Karen" at node 422 via node 418, "Project A," and node 420, "Sales Department," contact information or meeting options of "Karen" at node 422, and resources 115 (e.g., shared documents or email messages) between identifications associated with "Jane Doe" and "Karen" may be determined to be relevant to the query provided. However, contact information or other information pertaining to "Karen" at node 436 may be determined to be less relevant or not relevant at all based on the connection shown between "Jane Doe" at node 410 and "Karen" at node 436.

Additionally, based on the exemplary search query "Karen," the data system 130 may also determine information and resources 115 related to "Project A," shown at node 418, are relevant to the query based on the connection of both node 410 and node 422 to "Project A." However, information and resources 115 related to "Project B," shown at node 428, may not be determined to be relevant based on the lack of a connection between node 428 and node 422.

Further, the enterprise knowledge graph 400 includes "Susan" at node 440 that is connected to "Jane Doe" at node 410 by edge 438. "Susan" may be, for example, a sales lead that "Jane Doe" has previously met with and/or exchanged correspondence with. "Susan," in the current example, at node 440 is connected to "Company A" at node 444 by edge 442, as she may be, for example, an account manager at "Company A." Additionally, node 444 is connected to "Clients" at node 448 of the enterprise by edge 446, and node 448 is connected to the "Sales Department" at node 414 by edge 450. For example, if "Mark," seen at node 458, were another account manager for "Company A," and in Jane Doe's previous email exchange with Susan, she told Jane Doe that her sales proposal needed to be discussed with "Mark" for approval, edge 451 may be created between nodes 440 and 458 based on the entities provided in resources 115 (e.g., enterprise email).

Based on the exemplary enterprise knowledge graph 400, if enterprise member "Jane Doe," the entity at node 410, were to provide a search query "Company A," the Data System 130 would analyze the enterprise knowledge graph 400 to determine what is relevant to the query. For example, based on the connection between nodes 410 and 440, documents, emails, and biographical and contact information related to "Susan" may be determined to be relevant. Additionally, based on the exemplary sales lead email where Susan advised Jane Doe to speak to Mark, biographical and contact information for Mark may also be determined to be relevant.

Further, for example, Jane Doe has an upcoming trip scheduled to "Atlanta," seen at node 454 and connected by edge 452 to node 410. If, for example, the information related to Mark at node 458 indicates that Mark's office is in "Atlanta," then a connection can be made between Atlanta node 454 and Mark node 458 by edge 456. As such, in the results provided to enterprise member Jane Doe's query of "Company A," the data system 130 may determine that it is relevant to provide enterprise member Jane Doe with an option to compose an email to Mark, call Mark, or schedule a calendar invitation to meet with Mark. As such, the entity facts 220 created based on entities 210 and resources 115, in some implementations, can be opportunities for current or future action. The query results as described above are merely exemplary, and other types and methods of providing query results may be included. In some implementations, the enterprise knowledge graph 400 may include information related to an organizational structure of the enterprise, which can be obtained from one or more resource 115, where the positions and members holding those positions are relationally structured in the enterprise knowledge graph 400.

Figure 5:
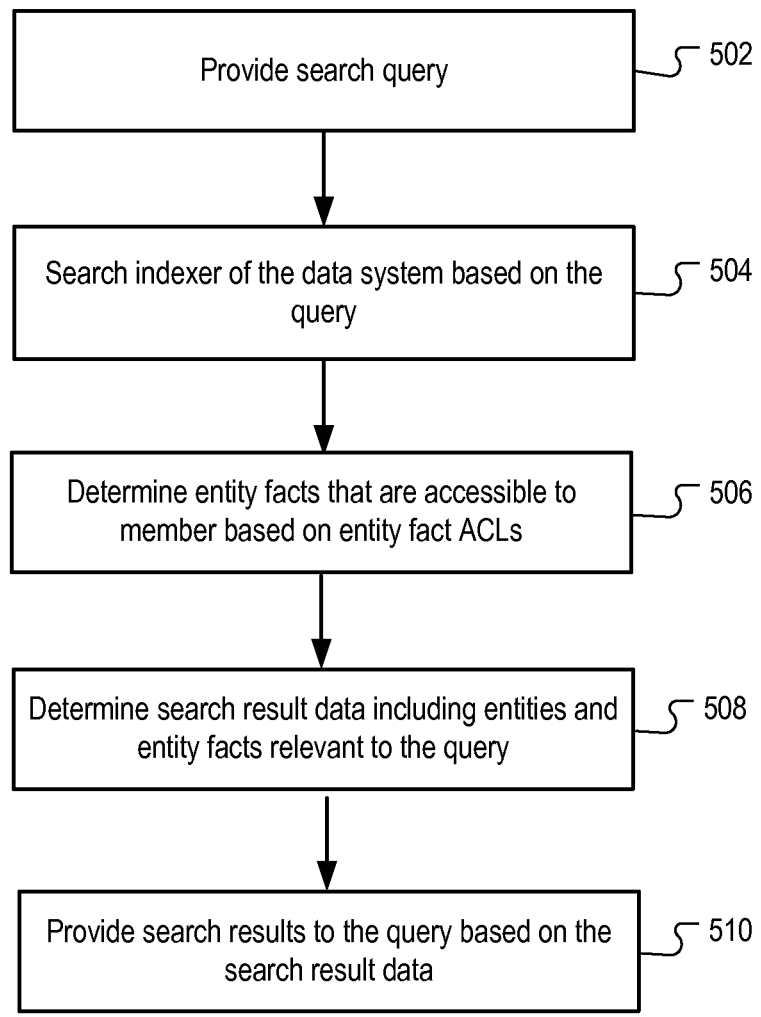
FIG. 5 is a flow chart of an example process for providing search results to an enterprise member.

FIG. 5 is a flow chart of an example process 500 for providing search results to an enterprise member based on a query provided by the enterprise member. The process 500 can, for example, be implemented by the data system 130. In some implementations, the operations of the example process 500 can be implemented as instructions stored on a non-transitory computer readable medium, where the instructions cause a data processing apparatus to perform operations of the example process 500.

A search query provided by a member of the enterprise is received by the data system 130 (502). In some implementations, the enterprise information system 110 may provide an interface to the member of the enterprise to receive queries that are input by the member. The interface may be provided via, for example, an application or program that is in communication with the data system 130, or in some implementations, the interface may communicate to the data system 130 directly.

Once the query is received, the search engine 138 may search the data storage 134, which stores the data received from the enterprise information system 110 and that has been indexed (504). As previously described, the data system 130 receives resources 115, including member information, and the resources 115 include data describing entities 210 and entity facts 220, where the entity facts 220 are identified from the entities 210 of the resources 115. Each entity fact 220 describes at least one feature of an entity 210, where the features describe corresponding relationships between the entities 210. Additionally, the indexer 136 includes data defining access privileges to the data entity fact access control list 230 for each entity fact 220, which is determined from the access control list of each resource 115, as previously described.

The entity facts 220 that are accessible to the member are determined based on the entity fact access control lists 230 (506), as previously described. For example, only facts and resources for having an access control list that specifies the member has access to the fact or resource are provided. Other facts and resources to which the member does not have read access are not identified for the member.

Further, search result data including data describing entities 210 and entity facts 220 relevant to the query are determined based on member information of the member and entity facts 220 that are accessible to the member (508). For example, entities 210 and entity facts 220, as previously described, which are determined to be relevant to the member's query are identified. Additionally, the member's position or relationships within the enterprise can factor into what is relevant to the member query as well as the source information 112 and resources 115 the member interacts with and uses. Activities of the member and the time and date the query was provided can determine or factor into the relevancy. Further, an enterprise knowledge graph representation, like enterprise knowledge graph 400, may be used to determine the relevancy of resources 115, entities 210, and entity facts 220 of enterprise relationship information.

Search results to the query provided by the enterprise member are provided based on the search result data (510). The search result data may include entities 210, entity facts 220, the underlying resources 115 from which the entities 210 and/or entity facts 220 are derived, or a combination thereof. The underlying resources 115 from which the entities 210 and/or entity facts 220 are derived may be embedded in the entity 210 and/or entity fact 220 that is presented. For example, the underlying resource 115 may be provided as a link (e.g., hyperlink), drop down selection box, hover selection, among others. In some implementations, if an entity fact, for example 220*a*, is derived from more than one resource, for example both resource 115*a*1 and resource 115*b*1, then the embedded underlying resource for the entity fact 220*a* may include one or both (or more) of the resources from which the entity fact 220*a* was derived. In implementations where only one of the underlying resources 115 is provided, the selection of the underlying resource may be based on the most relevant resource of each of the underlying resources to the member. For example, if the query member is part of the sales department, and underlying resource 115*a*1 is stored in the sales department location of the database while underlying resource 115*b*1 is stored in the engineering department location of the database, resource 115*a*1 may be determined to be most relevant to the member. Additionally, in some implementations, query suggestions may be provided to the member based on the query that was provided or is in the process of being provided (e.g., the member is currently inputting) and/or the search results. The data system 130 may be configured to interpret and understand natural language input.

The presentation of the search results may be provided as a list of the search result data, and in some implementations one or more knowledge panel may be provided in the search results. A knowledge panel may be presented inline or adjacent to other search results for a received query or in place of the other search results. The knowledge panel may provide information related to an entity 210 and/or entity fact 220 referenced by a search query. In some implementations, a knowledge panel may provide a summary of information for the entity 210 and/or entity fact 220. For example, a knowledge panel for "Jane Doe," as provided above at node 410, may include an enterprise profile picture of Jane Doe, the department that she works in, her contact information, a biography, among other content (including a link to Jane Doe's enterprise webpage). A knowledge panel for a particular entity 210 and/or entity fact 220 may also, or alternatively, include information about other entities 210 and/or entity facts 220 that have been identified as related to the particular entity 210 and/or entity fact 220. For example, if the enterprise member Jane Doe referenced above is the sales account manager for "Company A," the knowledge panel for the enterprise member Jane Doe may include information about Company A, like contact and location information. For example, the information about Company A may also include information about a sales lead contact at Company A, for example "Susan" (at node 440). Information about Susan may also include a Company A profile picture of Susan, the department that she works in, her contact information, a biography, among other content (including a link to Susan's Company A enterprise webpage).

Entity Fact Search Processing

Figure 6:
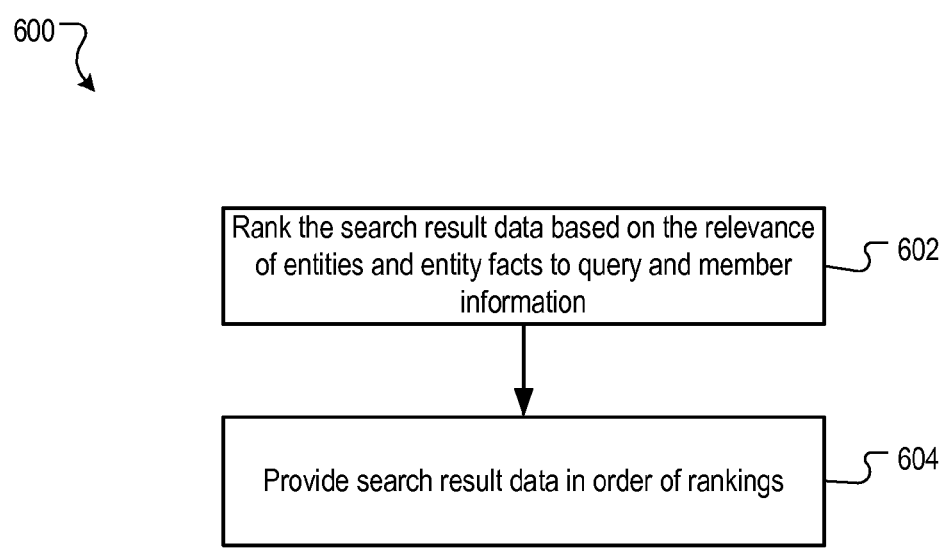
FIG. 6 is a flow chart of an example process for ranking and providing the search results to an enterprise member.

FIG. 6 is a flow chart of an example process 600 for ranking and providing the search results to an enterprise member based on a query provided by the enterprise member. The process 600 can, for example, be implemented by the data system 130. In some implementations, the operations of the example process 600 can be implemented as instructions stored on a non-transitory computer readable medium, where the instructions cause a data processing apparatus to perform operations of the example process 500.

In some implementations, the search result data may be ranked based on the relevance of the entities 210 and entity facts 220 in relation to the query and member information of the query member (602). As described above, the relevant entities 210 and entity facts 220 may be determined, and then results may be ranked or organized based on the level of relevance based on the query member and query provided. The search result data may then be provided in the order of the rankings to the member of the enterprise (604).

In some implementations, a quality score may be determined for each entity 210 and entity fact 220 based on the query provided by the member of the enterprise. The quality score may indicate the level of relevance for each entity 210 and entity fact 220 to the query. The quality score can be member specific, a partial or total aggregate, or a combination thereof. The enterprise knowledge graph, as described in FIG. 4, may be used and factored in to the quality score to associate the relevance of the entities 210 and entity facts 220 in relation to the query and member of the enterprise providing the query. Additionally, the quality score for the entities 210 and entity facts 220 can be based on explicit indications and/or implicit indications by the member of the enterprise or a collection of members of the enterprise. For example, a member of the enterprise may explicitly indicate they prefer information (e.g., entities 210 and entity facts 220) that are from particular resources 115 or information sources 112 (e.g., the internet, email, or a sales department database). Other explicit indications may include a preference of resources 115 the member is an author of, resources 115 created by a member in the member of the enterprise's department or group, or interests expressed by the user (e.g., the stock market price of the enterprise), among others.

Implicit indications may be any type of indication that is provided without the member's explicit input. As already described above, in order to determine the relevancy of entities 210 and entity facts 220, different information related to the member's interactions with the enterprise system 110 and data system 130 can provide implicit indications. For example, implicit indications may include the member's position, group, or department within the enterprise, the information sources 112 and resources 115 the member has recently or regularly interacted with, and activities of the member.

Additionally, implicit indications can be provided by the member or a collection of members of the enterprise based on how the member or collection of members interacts with the search results that are provided to the query. For example, in some implementations, parameters may be applied to the quality score. Exemplary parameters may be one or more of a mean reciprocal rank, a mean precision, an average click position, a click through rate, and an abandonment rate, among others. The mean reciprocal rank can be a statistical measure for evaluating any process that produces a list of possible query results to a sample of queries, ordered by probability of correctness. The reciprocal rank of a query response is the multiplicative inverse of the rank of the first correct answer, and the mean reciprocal rank is the average of the reciprocal ranks of results for a sample of queries. Average click position may be the average rank in the order of provided query search results that the member selected. Click through rate may be the rate that a particular query search result is selected, and abandonment rate may be a number of abandoned queries divided by the number of queries related to one or more of the same or similar queries or the same or similar queries provided by a member a collection of members. An abandoned query is a query that has no subsequent query search result selection and does not have any subsequent refinements to the query.

These are only exemplary parameters and other parameters or modifications to the parameters above may be provided.

Further, in some implementations, click result information can be included in the quality score. For example, if the member or average of collection of members, select a search result with a long click (e.g., the click lasting longer than a threshold period of time), then the search result in relation to the search query may be determined to be more relevant than if a search result is selected with a short click, where it could be determined that a certain percentage of time the search result selected with the short click was inadvertently selected. Additionally, search results that are not clicked to be selected may be determined to be less relevant to the query provided.

The relevancy, including the quality score, of each search result to each query provided may auto-tuned, that is modified and/or adjusted, by the data system 130 based on the member's or collection of member's interaction with the search results. For example, if the member provides a query for "Company A" and selects the second search result that is related to an entity fact 220 about "Susan" at Company A, then the quality score for that entity fact 220 may increase while quality scores for other entities 210 and entity facts 220 provided in the search results, that were determined to be relevant, may decrease or otherwise adjust. Additionally, enterprise acronyms and synonyms associated with entities 210 and entity facts 220 may be determined by the data system 130 based on the auto-tuning process.

In some implementations, the auto-tuning process may be performed automatically by the data system 130 without human input or intervention after the auto-tuning process is established. Many enterprise data systems 110 contain sensitive and secret information that must remain confidential within the enterprise; therefore, intervention or input at the data system 130 may not be provided in order to preserve the confidentiality and secrecy of information within the enterprise. In some implements, the relevancy determination, including the quality score, may be based on a static and/or dynamic algorithm, formula, heuristic, or a combination thereof.

Enterprise Assistants

The entity facts and related information can also be used for other information support operations for members of the enterprise. One example expanding the role of computer-implemented assistants to use enterprise information, subject to the access control lists.

Figure 7:
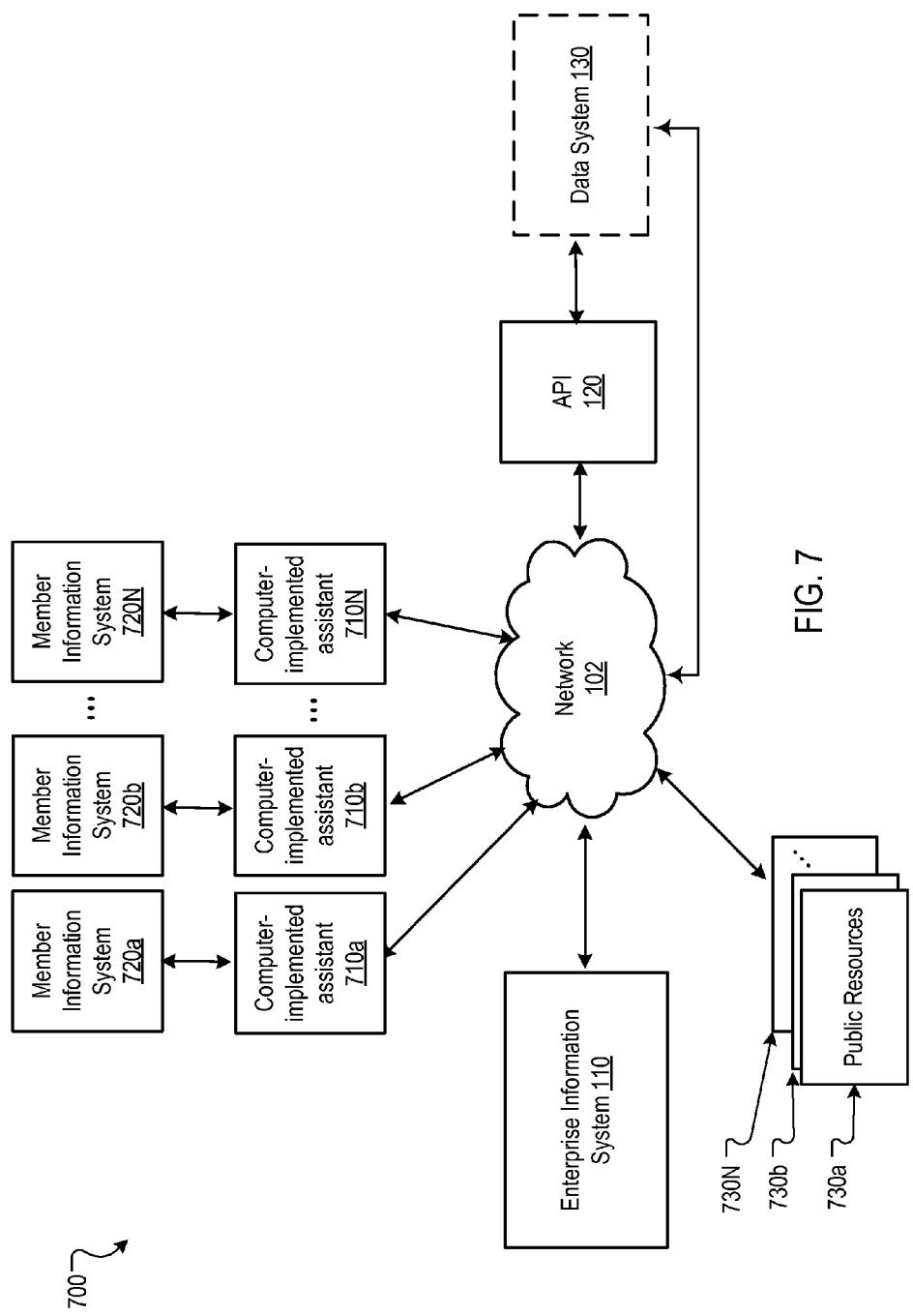
FIG. 7 is a block diagram that incorporates computer-implemented assistants into the example environment structure of FIG. 1.

FIG. 7 is an example environment 700 that incorporates computer-implemented assistants into the example environment structure of example environment 100. Additionally, in some implementations, one or more members of the enterprise can use the computer-implemented assistants 710, as seen in example environment 700. As seen in FIG. 7, the one or more computer-implemented assistants 710*a*, 710*b*, . . . , 710N, are communicatively connected to the enterprise information system 110, data system 130, member information system 720 (seen in FIG. 7 as 720*a*, 720*b*, . . . , 720N), and with each other computer-implemented assistant 710, or combinations thereof. However, such communication is not required, and in some embodiments, communication with more or fewer devices and systems may be included. Member information system 720 can include information that is not described or included in the resources 115, but is accessible to the particular member associated with a particular computer-implemented assistant. For example, a member's personal email, personal calendar, or personal travel information may be included in the member information system 720. The member information system 720 may be implemented on one or more devices (e.g., computer, mobile device, smart phone, tablet), and the storage of the member personal information may be on one or more of the devices, on different devices, or in a cloud storage environment, among others. The computer-implemented assistant 710 is configured to be implemented in any compatible software application, and the computer-implemented assistant 710 is not required to be used on only one application and/or one user device. Additionally, as seen in FIG. 7, in some implementations, the computer-implemented assistant 710 may communicate with data system 130 without the use of API 120.

As previously described, data system 130 accesses and integrates enterprise resources 115 that include data describing entities 210 and entity facts 220. Each entity fact 220 includes an entity fact access control list 230 that is provided from the underlying resource 115 from which the entity fact 220 was obtained, and each member has access privileges to resources 115, entities 210, and entity facts 220 according the respective entity fact access control lists 230. Additionally, in some implementations, member personal information may also be provided from the member information system 720 to the enterprise information system 110 and/or the data system 130.

The computer-implemented assistant 710 for each member of the enterprise can determine enterprise information specific to the member, including entities 210 and entity facts 220, and integrate the member personal information with the enterprise information specific to the member. For example, the computer-implemented assistant 710 can determine a calendar for the particular member based on the member personal information and the enterprise information specific to the member. Based on the computer-implemented assistant 710 combining this information, the computer-implemented assistant 710 can determine enterprise actions to perform for the member, where the enterprise actions are actions specific to the member's enterprise-related responsibilities. For example, the enterprise-related responsibilities include work meetings, arrangements, and travel, among others, but may not include scheduling a personal vacation.

In order to provide enterprise actions for the member, the computer-implemented assistant 710 may analyze and determine data related to one or more locations a user device has visited or is scheduled to visit, one or more enterprise member user devices that the user device has interacted with, interests of the member, industry information relevant to the member, and calendar information of the member, among others. This exemplary data may be provided by one or more user devices of the member, the enterprise information system 110, the data system 130, the member information system 720, or a combination thereof.

Further, in some implementation, public resources 730 (seen in FIG. 7 as 730a, 730b, . . . , 730N) that are published by entities external to the enterprise may be included in the information the computer-implemented assistant 710 uses to perform enterprise actions for the member. The computer-implemented assistant 710, as previously described, may communicate with the data system 130, and the schema provided at the data system 130 may also be used by the computer-implemented assistant 710 in order to sort and understand the information provided by the public resources. In some implementations, the API 120 is used to tag and index content and information received by the computer-implemented assistant 710. Public resources may be, for example, information obtained on the internet, a travel database system, a professional networking application, among others. In the current implementation, the computer-implemented assistant 710 may determine a subset of public information from the public resources that is relevant to the particular member. For example, when the public resource is a travel database system and the member has a scheduled meeting in "Atlanta," the computer-implemented system 710 may determine that the subset of public information that is relevant to the particular member is the flights or other transportation modes from the current city the member is located to Atlanta, Ga. The computer-implemented assistant 710 may determine the subset of public information that is relevant to the particular member based on the member personal information, enterprise information specific to the member, and the entity facts 220, among other information. After determining the subset of public information relevant to the particular member, the computer-implemented assistant 710 may determine enterprise actions to perform for the member.

Enterprise actions to perform for the member can be context specific and may include presenting insights or information to the member, presenting opportunities (e.g., a business lead) to the member, or a completion of one or more task for the member. For example, an enterprise action may include declining an invitation for a meeting. Declining could be based on a multitude of reasons, including the member having a vacation scheduled (even if this is only listed on the member's personal calendar) or a scheduling conflict. Additionally, enterprise actions may include rescheduling a conflicting meeting, booking a flight, booking a hotel room, presenting local transportation options, finding restaurants suitable to the member, creating reservations at restaurants suitable to the member, presenting a daily agenda (where some items can be automatically generated), among others.

Additionally, an enterprise action may include providing relevant information (e.g., a document or slide presentation) to the member at the time of a scheduled meeting or event. The relevancy of information to a scheduled meeting or event may be based on the information available to the computer-implemented assistant 710, including member personal information, enterprise information specific to the member, the entity facts, and the subset of public information. The computer-implemented assistant 710 may present to one or more of the user devices of the member the relevant information, including an enterprise resource, prior to or at the time of the event or meeting scheduled. For example, when the member has a scheduled meeting with "Tom," another member of the enterprise, and Tom has scheduled the meeting to discuss a particular document, the computer-implemented assistant 710 can determine the particular document is relevant to the meeting—for example, based on the title of the meeting, from an email exchange between Tom and the member, among others), and provide the document to the member at the time of the meeting or at a time prior to the scheduled meeting. Further, in some implementations, the computer-implemented assistant 710 may provide informational material, including public resources, to the one or more user devices of the member if that material is determined to be relevant to a scheduled meeting or event. For example, the member may have a meeting scheduled to discuss a complicated technical topic, and the computer-implemented assistant 710 may provide technical background information or other type of information to the member prior to the meeting.

In some implementations, the enterprise actions include presenting opportunities (e.g., a business lead) to the member. For example, if the member is in the sales department of the enterprise and has a scheduled trip to "Atlanta," where a sales lead is also visiting (e.g., known based on a previous email exchange between the member and the sales lead), the computer-implemented assistant 710 may present the one or more user devices of the member with a notification that the sales lead will also be in Atlanta at that time, and the computer-implemented assistant 710 can also ask or prompt the member if they would like to schedule a meeting or otherwise contact the sales lead while in Atlanta. After each enterprise action is determined to be performed, the computer-implemented assistant 710 causes the one or more user devices of the member to present a notification describing the enterprise action to the member.

The computer-implemented assistant 710, in some embodiments, can coordinate between the computer-implemented assistant 710 of one or more other member of the enterprise. The computer-implemented assistant 710 of the member can determine that an enterprise action involves at least one other member of the enterprise. For example, if the computer-implemented assistant 710 of the member scheduled a business trip after planning a meeting with another member of the enterprise, the computer-implemented assistant 710 of the member can determine that the business trip that has been scheduled affects the currently scheduled meeting. The computer-implemented assistant 710 may communicate with the computer-implemented assistant 710 of the other member and include information about the enterprise action that pertains to the at least one other member. For example, when the newly scheduled business trip conflicts with the scheduled business meeting, the computer-implemented assistant 710 of the member may provide information to computer-implemented assistant 710 of the other member that notifies the computer-implemented assistant 710 of the other member that the member is not able to make the meeting and other meeting times could be proposed. However, information from the enterprise action about where the member is traveling, who the member is meeting with, when the member is leaving for the trip, among other information related to the enterprise action, is not provided to the computer-implemented assistant 710 of the other member because that information would not pertain to the at least one other member. Further, in some implementations, the computer-implemented assistant 710 of each of the at least one or more other member may perform an enterprise action based on receiving the pertaining information of the enterprise action of the member.

Further, in some implementations, the computer-implemented assistant 710 is configured to be implemented on a third party application on the member device. For example, the third party application may be a travel system application that includes the member's boarding pass and other travel information. As such, the third party application can provide relevant third party application member personal information to the computer-implemented assistant 710. Additional third party applications may also be used, for example, applications for banking, correspondence (e.g., email), professional networking, among others.

Figure 8:
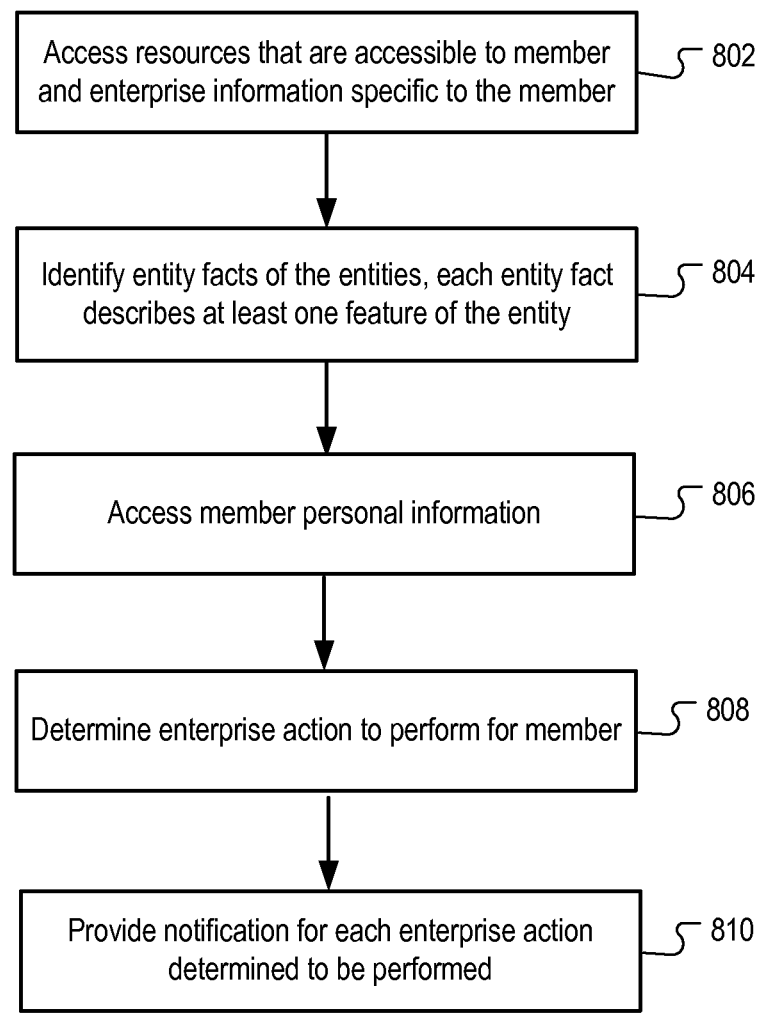
FIG. 8 is a flow chart of an example process for providing enterprise actions by a computer-implemented assistant.

FIG. 8 is a flow chart of an example process 800 for providing enterprise actions by a computer-implemented assistant 710 for a member of the enterprise. The process 800 can, for example, be implemented by the computer-implemented assistant 710. In some implementations, the operations of the example process 800 can be implemented as instructions stored on a non-transitory computer readable medium, where the instructions cause a data processing apparatus to perform operations of the example process 800.

Enterprise resources 115 that are accessible to a member of the enterprise, based on the entity fact access control lists 230, where the resources 115 include data describing entities 210 and relationships among the entities (including entity facts 220), and enterprise information specific to the member are accessed (802). Additionally, as previously described, entity facts 220 of the entities 210 from the resources 115, each entity fact 220 describing at least one feature of the entity 210 are identified (804). Further, as previously described, member personal information specific to the member, the member personal information including information not described by the enterprise resources that are accessible to the member is accessed (806). The computer-implemented assistant 710 then determines enterprise actions, as described above, to perform for the member based on the member personal information, enterprise information specific to the member and the entity facts (808). For each enterprise action determined to be performed, the computer-implemented assistant 710 provides a notification to the member describing the enterprise action performed (810).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, comprising:
   receiving a query from a member of an enterprise;
   searching an index that includes member information of members of the enterprise and documents of the enterprise, wherein:
      the documents include data describing entities and entity facts related to the enterprise and relationships among the entities, and each document has a respective access control list specifying access privileges to the document for members of the enterprise;
      the entity facts are identified from the entities of the documents of the enterprise;
      each entity fact describes at least one feature of the entity, wherein the feature of the entity is a relationship between the entity and another entity and wherein each entity fact is derived from one or more corresponding documents in which the entity fact is described; and
      the index includes data defining access privileges to the data describing the entities and the entity facts according to respective entity fact access control lists, wherein each entity fact access control list is different from the access control lists provided for the documents of the enterprise, and each entity fact inherits an access control list of a document from which the entity fact is derived, wherein deriving the entity facts comprises selecting each document from the documents, and for the selected document:
   determining a first entity identified within the document;
   determining a second entity identified within the document;
   determining a relationship between the first entity and the second entity that is described within the document; and
   generating, as the entity fact, data describing the first entity, the second entity, and the relationship between the first entity and the second entity as described in the document:
      wherein multiple entity facts are derived from a selected document;
determining the entity facts that are accessible to the member according to the entity fact access control lists;
determining, based on member information of the member, and entity facts that are accessible to the member, search result data including data describing entities and entity facts relevant to the query; and
providing search results, based on the search result data, to the member of the enterprise, the search results including data describing the entities and entity facts determined to be relevant to the query.

2. The method of claim 1, wherein member information of the member includes at least one of the member's role in the enterprise, an organizational structure of the enterprise, the member's contacts, and the member's relationship with the provided query.

3. The method of claim 2, wherein the member's relationship with the provided query includes:
   determining, by a data system, that the query corresponds to at least one of an entity fact and entity of the enterprise;
   relating, by the data system, the query with the at least one of an entity fact and entity; and
   determining, by the data system, the member's relationship with the at least one of the entity fact and entity.

4. The method of claim 1, further comprising:
   ranking the search result data based on a relevance of the entities and entity facts in relation to the query and member information of the member; and
   providing the search results, based on the search result data, in an order of the rankings to the member of the enterprise including data describing the entities and entity facts determined to be relevant to the query.

5. The method of claim 4, wherein the ranking the search result data based on the relevance of the entities and entity facts in relation to the query and member information, further comprises:
   determining a quality score of the entities and entity facts, the quality score describing the relevance of the entities and entity facts in relation to the query and member information of the member; and
   ranking the search result data based in part on the quality score of the entities and entity facts.

6. The method of claim 5, wherein the quality score is based on one or more parameters, the one or more parameters being at least one of a mean reciprocal rank, a mean precision, an average click position, a click through rate, and an abandonment rate.

7. The method of claim 4, further comprises:
   receiving a selection from the search results provided to the member; and
   adjusting a quality score of the entities and entity facts based on the selection from the search results provided to the member.

8. The method of claim 7, wherein the adjusting occurs by auto-tuning without member input.

9. A system, comprising:
a processor; and
a computer-readable medium coupled to the processor and having instructions stored thereon, which, when executed by the processor, cause the processor to perform operations comprising:
   receiving a query from a member of an enterprise;
   searching an index that includes member information of members of the enterprise and documents of the enterprise, wherein:
      the documents include data describing entities and entity facts related to the enterprise and relationships among the entities, and each document has a respective access control list specifying access privileges to the document for members of the enterprise;
      the entity facts are identified from the entities of the documents of the enterprise;
      each entity fact describes at least one feature of the entity, wherein the feature of the entity is a relationship between the entity and another entity and wherein each entity fact is derived from one or more corresponding documents in which the entity fact is described; and
      the index includes data defining access privileges to the data describing the entities and the entity facts according to respective entity fact access control lists, wherein each entity fact access control list is different from the access control lists provided for the documents of the enterprise, and each entity fact inherits an access control list of a document from which the entity fact is derived, wherein deriving the entity facts comprises selecting each document from the documents, and for the selected document:
         determining a first entity identified within the document;
         determining a second entity identified within the document;
         determining a relationship between the first entity and the second entity that is described within the document; and
         generating, as the entity fact, data describing the first entity, the second entity, and the relationship between the first entity and the second entity as described in the document;
            wherein multiple entity facts are derived from a selected document;
      determining the entity facts that are accessible to the member according to the entity fact access control lists;
      determining, based on member information of the member, and entity facts that are accessible to the member, search result data including data describing entities and entity facts relevant to the query; and providing search results, based on the search result data, to the member of the enterprise, the search results including data describing the entities and entity facts determined to be relevant to the query.

10. The system of claim 9, wherein member information of the member includes at least one of the member's role in the enterprise, an organizational structure of the enterprise, the member's contacts, and the member's relationship with the provided query.

11. The system of claim 10, wherein the member's relationship with the provided query includes:
 determining that the query corresponds to at least one of an entity fact and entity of the enterprise;
 relating the query with the at least one of an entity fact and entity; and
 determining the member's relationship with the at least one of the entity fact and entity.

12. The system of claim 9, further comprising:
 ranking the search result data based on a relevance of the entities and entity facts in relation to the query and member information of the member; and
 providing the search results, based on the search result data, in an order of the rankings to the member of the enterprise including data describing the entities and entity facts determined to be relevant to the query.

13. The system of claim 12, wherein the ranking the search result data based on the relevance of the entities and entity facts in relation to the query and member information, further comprises:
 determining a quality score of the entities and entity facts, the quality score describing the relevance of the entities and entity facts in relation to the query and member information of the member; and
 ranking the search result data based in part on the quality score of the entities and entity facts.

14. The system of claim 12, further comprises:
 receiving a selection from the search results provided to the member; and
 adjusting a quality score of the entities and entity facts based on the selection from the search results provided to the member.

15. The system of claim 14, wherein the adjusting occurs by auto-tuning without member input.

16. A computer-readable medium having instructions stored thereon, which, when executed by a processor, cause the processor to perform operations, comprising:
 receiving a query from a member of an enterprise;
 searching an index that includes member information of members of the enterprise and documents of the enterprise, wherein:
  the documents include data describing entities and entity facts related to the enterprise and relationships among the entities, and each document has a respective access control list specifying access privileges to the document for members of the enterprise;
  the entity facts are identified from the entities of the documents of the enterprise;
  each entity fact describes at least one feature of the entity, wherein the feature of the entity is a relationship between the entity and another entity and wherein each entity fact is derived from one or more corresponding documents in which the entity fact is described; and
  the index includes data defining access privileges to the data describing the entities and the entity facts according to respective entity fact access control lists, wherein each entity fact access control list is different from the access control lists provided for the documents of the enterprise, and each entity fact inherits an access control list of a document from which the entity fact is derived, wherein deriving the entity facts comprises selecting each document from the documents, and for the selected document:
   determining a first entity identified within the document;
   determining a second entity identified within the document;
   determining a relationship between the first entity and the second entity that is described within the document; and
   generating, as the entity fact, data describing the first entity, the second entity, and the relationship between the first entity and the second entity as described in the document;
   wherein multiple entity facts are derived from a selected document;
 determining the entity facts that are accessible to the member according to the entity fact access control lists;
 determining, based on member information of the member, and entity facts that are accessible to the member, search result data including data describing entities and entity facts relevant to the query; and
 providing search results, based on the search result data, to the member of the enterprise, the search results including data describing the entities and entity facts determined to be relevant to the query.

17. The computer-readable medium of claim 16, wherein member information of the member includes at least one of the member's role in the enterprise, an organizational structure of the enterprise, the member's contacts, and the member's relationship with the provided query.

18. The computer-readable medium of claim 16, further comprising:
 ranking the search result data based on a relevance of the entities and entity facts in relation to the query and member information of the member; and
 providing the search results, based on the search result data, in an order of the rankings to the member of the enterprise including data describing the entities and entity facts determined to be relevant to the query.

19. The computer-readable medium of claim 18, wherein the ranking the search result data based on the relevance of the entities and entity facts in relation to the query and member information, further comprises:
 determining a quality score of the entities and entity facts, the quality score describing the relevance of the entities and entity facts in relation to the query and member information of the member; and
 ranking the search result data based in part on the quality score of the entities and entity facts.

20. The computer-readable medium of claim 18, further comprises:
 receiving a selection from the search results provided to the member; and
 adjusting a quality score of the entities and entity facts based on the selection from the search results provided to the member.

* * * * *

UNITED STATES PATENT AND TRADEMARK OFFICE
CERTIFICATE OF CORRECTION

PATENT NO. : 9,998,472 B2
APPLICATION NO. : 14/723827
DATED : June 12, 2018
INVENTOR(S) : Verweyst et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this
Thirteenth Day of December, 2022

*Katherine Kelly Vidal*

Katherine Kelly Vidal
*Director of the United States Patent and Trademark Office*